United States Patent
Chen et al.

(10) Patent No.: US 10,843,081 B2
(45) Date of Patent: Nov. 24, 2020

(54) METHOD AND APPARATUS FOR VIRTUAL WALKING (71) Applicant: SHENZHEN REALIS MULTIMEDIA TECHNOLOGY CO., LTD, Shenzhen (CN)

(72) Inventors: Yanhang Chen, Shenzhen (CN); Jin Yao, Shenzhen (CN); Yan Huang, Shenzhen (CN)

(73) Assignee: SHENZHEN REALIS MULTIMEDIA TECHNOLOGY CO., LTD., Shenzhen (CN)

( * ) Notice: Subject to any disclaimer, the term of this patent is extended or adjusted under 35 U.S.C. 154(b) by 418 days.

(21) Appl. No.: 15/739,429

(22) PCT Filed: Oct. 14, 2016

(86) PCT No.: PCT/CN2016/102170
§ 371 (c)(1),
(2) Date: Dec. 22, 2017

(87) PCT Pub. No.: WO2018/068318
PCT Pub. Date: Apr. 19, 2018

(65) Prior Publication Data
US 2020/0139249 A1 May 7, 2020

(51) Int. Cl.
*A63F 13/65* (2014.01)
*A63F 13/655* (2014.01)
(Continued)

(52) U.S. Cl.
CPC .......... *A63F 13/655* (2014.09); *A63F 13/816* (2014.09); *G06F 3/011* (2013.01); *A63F 2300/8082* (2013.01); *G06F 2203/012* (2013.01)

(58) Field of Classification Search
CPC .................. A63F 13/655; A63F 13/816; A63F 2300/8082; G06F 3/011; G06F 2203/012
See application file for complete search history.

(56) References Cited

U.S. PATENT DOCUMENTS

| 2009/0111670 A1 | 4/2009 | Williams |
| 2010/0302233 A1 | 12/2010 | Holland |
| 2010/0305480 A1 | 12/2010 | Fu et al. |

FOREIGN PATENT DOCUMENTS

| CN | 101174332 A | 5/2008 |
| CN | 101446858 A | 6/2009 |
| CN | 105910614 A | 8/2016 |

OTHER PUBLICATIONS

The World Intellectual Property Organization (WIPO) International Search Report for PCT/CN2016/102170 dated Jul. 18, 2017 5 Pages.

*Primary Examiner* — Corbett B Coburn
(74) *Attorney, Agent, or Firm* — Anova Law Group, PLLC (57) ABSTRACT

The present disclosure provides a method and apparatus for virtual walking, which relates to the field of games. In the present disclosure, geometric-shape attribute parameters of a physical area in which a user walks may be acquired. Then, a plurality of virtual areas each matching the geometric-shape attribute parameters may be obtained in a virtual scene. Further, when the user walks to a corner of a physical area, a target virtual area is selected from the plurality of virtual areas and a virtual person corresponding to the user may be transferred from a current virtual area to the target virtual area. The current virtual area may be a virtual area among the plurality of virtual areas corresponding to the user's current walking status. Therefore, the method and apparatus for virtual walking in the present disclosure enable (Continued)

infinite virtual spaces within the confines of limited physical spaces without visual deviation.

10 Claims, 7 Drawing Sheets

(51) Int. Cl.
    *A63F 13/816*     (2014.01)
    *G06F 3/01*     (2006.01)

METHOD AND APPARATUS FOR VIRTUAL WALKING

CROSS-REFERENCE TO RELATED APPLICATIONS

This application is a national phase entry under 35 U.S.C. § 371 of International Application No. PCT/CN2016/102170, filed on Oct. 14, 2016, the entire content of all of which is incorporated herein by reference.

FIELD OF THE DISCLOSURE

The present disclosure generally relates to games and, more particularly, to a method and apparatus for virtual walking.

BACKGROUND

Currently, in existing walk VR (virtual reality) games, the designers use the workspace area as an upper limit, which confines the user's locomotion to a limited physical area. Users can only move in small physical areas, thus the game's contents are lack of variability and viewability. Some conventional redirected walking scheme change parameters like the user's moving speed ratio, rotation angle ratio, etc., so as to achieve an objective of enlarging actual moving distances in a game scene. However, the inconsistency between the user's real moving speed and a virtual person's moving speed as well as the inconsistency between the user's real rotation angle and the virtual person's virtual rotation angle may cause visual deviation, which may make users feel a sense of vertigo.

Thus, conventional technologies cannot enable infinite virtual spaces within the confines of limited physical spaces without visual deviation.

SUMMARY

The present disclosure provides a method and apparatus for virtual walking, aiming to solve a problem that conventional technologies cannot enable infinite virtual spaces within the confines of limited physical spaces without visual deviation.

A method for virtual walking is provided. The method comprises:

acquiring geometric-shape attribute parameters of a physical area in which a user walks;

in a virtual scene, obtaining a plurality of virtual areas each matching the geometric-shape attribute parameters; and after the user walks to a corner of the physical area, selecting a target virtual area from the plurality of virtual areas and transferring a virtual person corresponding to the user from a current virtual area to the target virtual area, wherein the current virtual area is a virtual area among the plurality of virtual areas corresponding to the user's current walking status.

The present disclosure also provides a virtual walking apparatus, including:

a parameter acquisition module, configured to acquire geometric-shape attribute parameters of a physical area in which a user walks;

a virtual area acquisition module, configured, in a virtual scene, to obtain a plurality of virtual areas each matching the geometric-shape attribute parameters; and a transfer module, configured, after the user walking to a corner of the physical area, to select a target virtual area from the plurality of virtual areas and transfer a virtual person corresponding to the user from a current virtual area to the target virtual area, wherein, the current virtual area is a virtual area among the plurality of virtual areas corresponding to the user's current walking status.

In the present disclosure, first, the geometric-shape attribute parameters of the physical area in which the user walks may be acquired. Then, the plurality of virtual areas each matching the geometric-shape attribute parameters may be obtained in the virtual scene. Further, when the user walks to the corner of the physical area, the target virtual area is selected from the plurality of virtual areas and the virtual person corresponding to the user may be transferred from the current virtual area to the target virtual area. The current virtual area may be a virtual area among the plurality of virtual areas corresponding to the user's current walking status. Because the virtual person corresponding to the user is transmitted between the plurality of virtual areas, the disclosed embodiments enable infinite virtual spaces within the confines of limited physical spaces without visual deviation.

BRIEF DESCRIPTION OF THE DRAWINGS

In order to provide a clear illustration of technical schemes according to various disclosed embodiments, the drawings used in the description of the disclosed embodiments are briefly described below. Obviously, the following drawings are merely some of embodiments of the disclosure. Other drawings may be obtained based on the disclosed drawings by those skilled in the art without creative efforts.

DETAILED DESCRIPTION

In order to provide a more detailed and clear understanding of the objectives, technical aspects, and advantages of the embodiments of the present disclosure, embodiments of the present disclosure are described in detail in connection with the drawings, which are only provided to explain the present disclosure and are not intended to limit the present disclosure.

Figure 1:
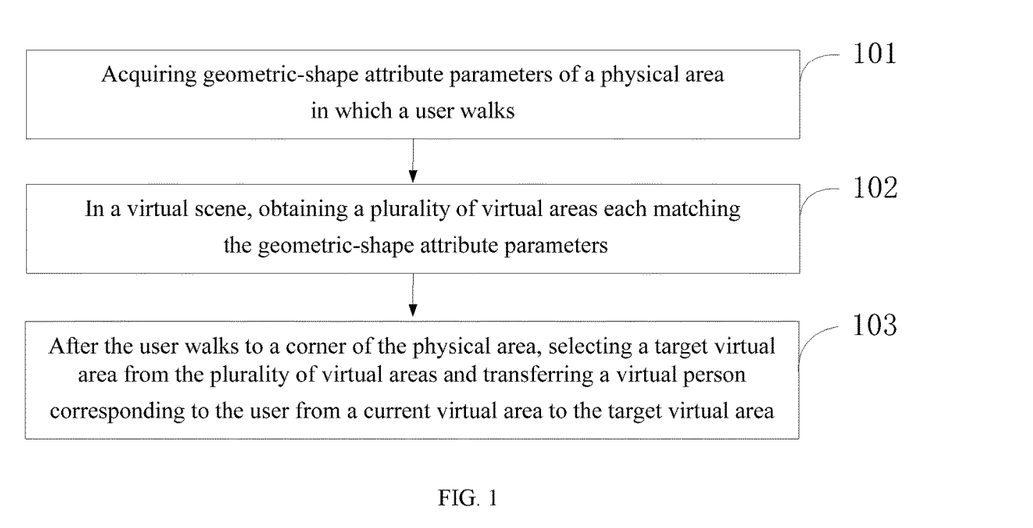
FIG. 1 is an implementation flow chart of a method for virtual walking according to embodiments of the present invention.

FIG. 1 is an implementation flow chart of a method for virtual walking according to an exemplary embodiment. For the sake of simplicity, only portions related to the disclosed embodiment are shown as follows.

Step 101, acquiring geometric-shape attribute parameters of a physical area in which a user walks. In the embodiment, the geometric-shape attribute parameters may include shape, length, width, and etc.

Step 102, in a virtual scene, obtaining a plurality of virtual areas each matching the geometric-shape attribute parameters.

The plurality of virtual areas may be a plurality of consecutive virtual areas or a plurality of separated virtual areas.

In the embodiment, the geometric-shape attribute parameters of each virtual area may be the same as the geometric-shape attribute parameters of the physical area. Therefore, the present disclosure does not need to change the parameters, for example, a ratio between the user's real moving speed and a virtual person's moving speed (i.e., a moving speed ratio), a ratio between the user's real rotation angle and the virtual person's rotation angle (i.e., a rotation angle ratio), and the like, so as to enlarge actual moving distances in a game scene. The visual deviation due to the inconsistency between the user's real moving speed and the virtual person's moving speed as well as the inconsistency between the user's real rotation angle and the virtual person's virtual rotation angle can be avoided. That is, the user's sense of vertigo can be avoided.

In the embodiment, the plurality of virtual areas may not overlap each other. Thus, it can maximize the coverage of the virtual scene of the game.

Step 103, after the user walking to a corner of the physical area, selecting a target virtual area from the plurality of virtual areas and transferring the virtual person corresponding to the user from a current virtual area to the target virtual area.

Figure 2:
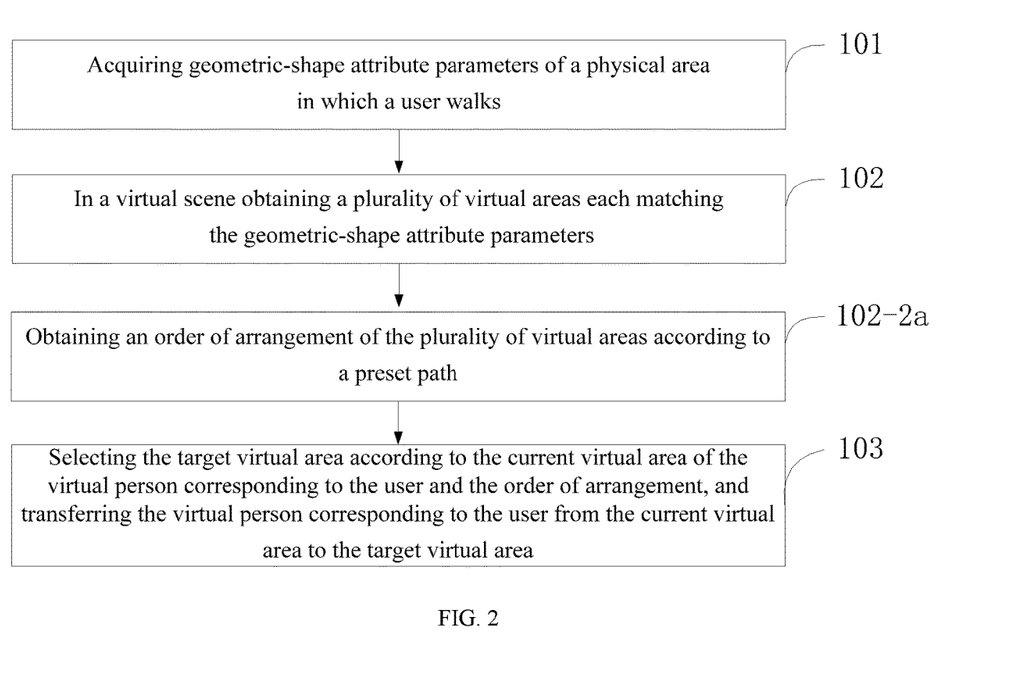
FIG. 2 is an implementation flow chart of another method for virtual walking according to embodiments of the present invention.

In an embodiment, as shown in FIG. 2, step 102-2a may be also included between steps 102 and 103.

Step 102-2a, obtaining an order of arrangement of the plurality of virtual areas according to a preset path.

Specifically, the step 103 may include selecting the target virtual area according to the current virtual area of the virtual person corresponding to the user and the order of arrangement, and transferring the virtual person corresponding to the user from the current virtual area to the target virtual area.

In the embodiment, by planning the user's moving path in the virtual scene, when the user explores back and forth in the physical area, the user can move between separate virtual areas in a virtual game world. As such, the user may think he has been across a long distance in the virtual game world.

Figure 10:
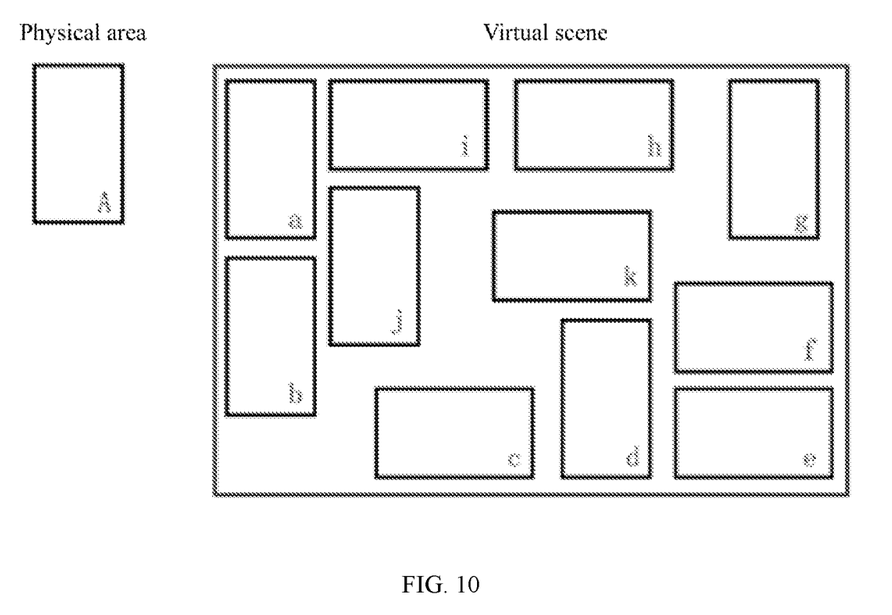
FIG. 10 a schematic diagram of a plurality of virtual areas according to embodiments of the present invention.

For example, as shown in FIG. 10, the geometric-shape attribute parameters of the physical area A in which the user walks may be acquired. The plurality of virtual areas (e.g. from a virtual area a to a virtual area k) each matching the geometric-shape attribute parameters may be obtained in the virtual scene. The order of arrangement of the plurality of virtual areas may be obtained according to the preset path. The order of arrangement is as following: the virtual area a, a virtual area b, a virtual area c, a virtual area d, a virtual area e, a virtual area f, a virtual area g, a virtual area h, a virtual area i, a virtual area j, and the virtual area k. When the user starts the game, the virtual person corresponding to the user is firstly set in the virtual area a. When the user walks to the corner of a physical area A [e.g. coordinates (0.2, 0.3)], the target virtual area (e.g. virtual area b) is selected according to the current virtual area (e.g. virtual area a) of the virtual person corresponding to the user and the order of arrangement. The virtual person corresponding to the user may be transferred from the current virtual area (e.g. the virtual area a) to the target virtual area (e.g. the virtual area b).

Figure 3:
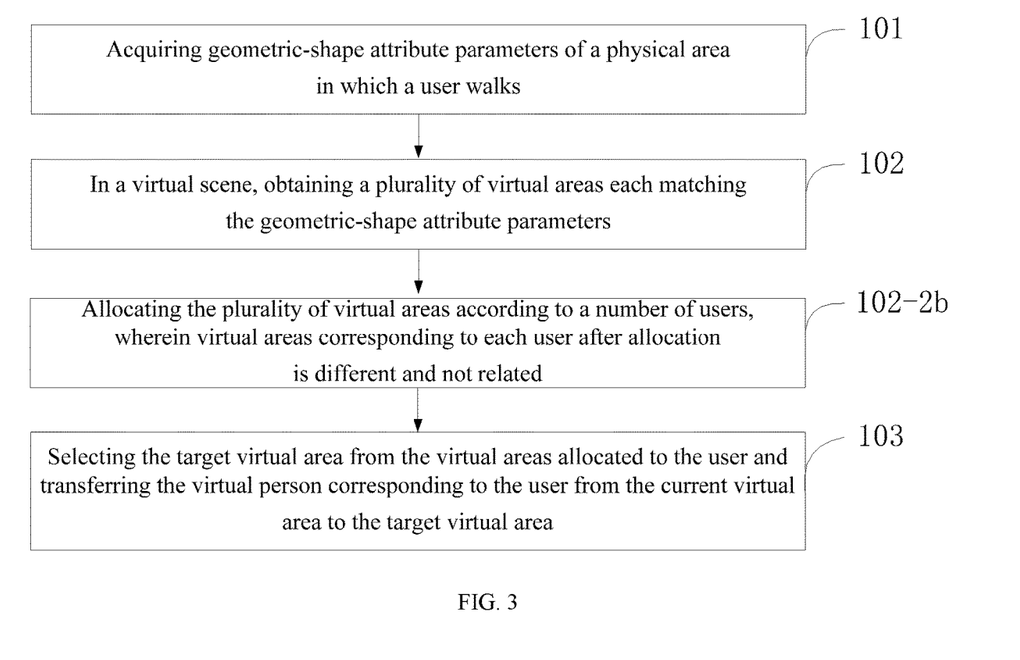
FIG. 3 is an implementation flow chart of another method for virtual walking according to embodiments of the present invention.

In an embodiment, as shown in FIG. 3, step 102-2b may be also included between steps 102 and 103.

Step 102-2b, allocating the plurality of virtual areas according to a number of users, where virtual areas corresponding to each user after allocation may be different and not related.

Specifically, the step 103 may include: selecting the target virtual area from the virtual areas allocated to the user and transferring the virtual person corresponding to the user from the current virtual area to the target virtual area.

In the embodiment, in the case of multiplayer games, independent moving paths may be designed for each user, and unrelated virtual areas may be allocated for each user. As such, moving paths for all users may not interfere with each other.

For example, as shown in FIG. 10, the geometric-shape attribute parameters of the physical area A in which the users walks may be acquired. The plurality of virtual areas (e.g. from the virtual area a to the virtual area k) each matching the geometric-shape attribute parameters may be obtained in the virtual scene. The plurality of virtual areas may be allocated according to the number of users (for example, 3 users, e.g. San Zhang, Si Li, and Wu Wang). The virtual areas a to d may be allocated to San Zhang, and the virtual areas e to h may be allocated to Si Li, and the virtual areas i to k may be allocated to Wu Wang. When San Zhang starts the game, a virtual person corresponding to San Zhang is firstly set in the virtual area a. When San Zhang walks to the corner of the physical area A [e.g. coordinates (0.2, 0.3)], the target virtual area (e.g. virtual area d) is selected from the virtual areas allocated to San Zhang, and the virtual person corresponding to San Zhang may be transferred from the current virtual area (e.g. virtual area a) to the target virtual area (e.g. virtual area d).

Figure 4:
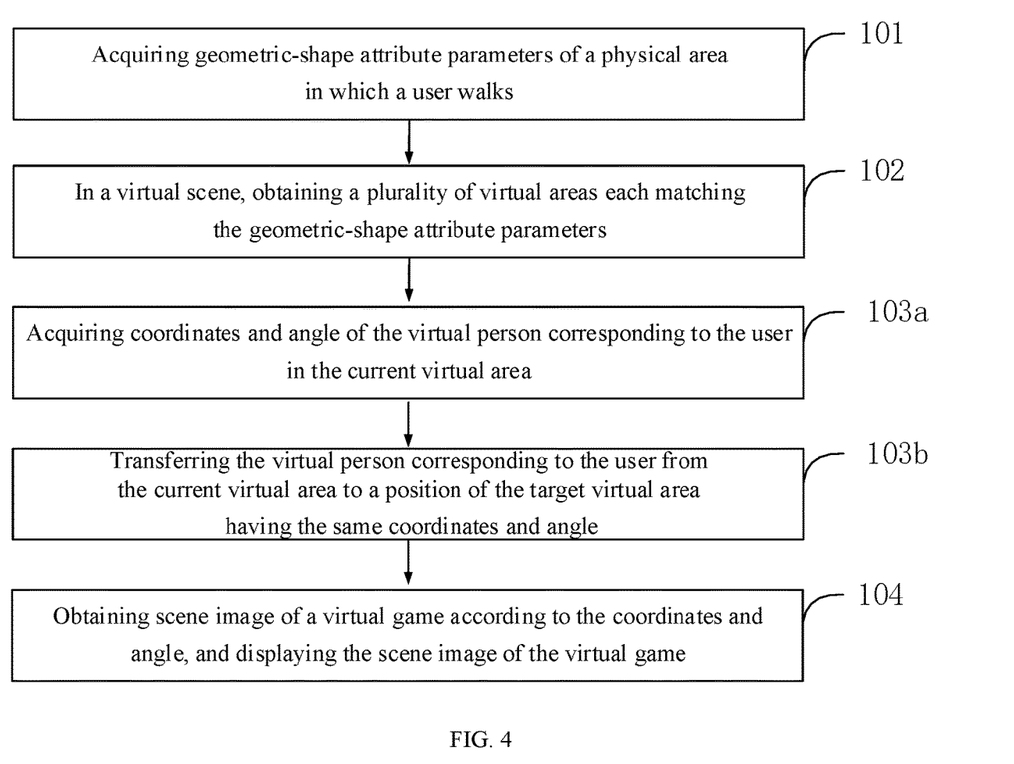
FIG. 4 is an implementation flow chart of another method for virtual walking according to embodiments of the present invention.

In an embodiment, as shown in FIG. 4, step 103 may also include steps 103a and 103b.

Step 103a, acquiring coordinates and angle of the virtual person corresponding to the user in the current virtual area.

Step 103b, transferring the virtual person corresponding to the user from the current virtual area to a position of the target virtual area having the same coordinates and angle.

In the embodiment, step 103b specifically includes transferring the virtual person from the current virtual area to the target virtual area, and keeping the coordinates and angle of the virtual person unchanged.

After step 103, step 104 may also be included.

Step 104, obtaining a scene image of the virtual game according to the coordinates and angle, and displaying the scene image of the virtual game.

In the embodiment, specifically, obtaining the scene image of the virtual game according to the coordinates and angle in step 104 includes: obtaining the scene image of the virtual game according to the coordinates and angle in the target virtual area.

For example, as shown in FIG. 10, the geometric-shape attribute parameters of the physical area A in which the user walks may be acquired. The plurality of virtual areas (e.g., from the virtual area a to the virtual area k) matching the geometric-shape attribute parameters may be obtained in the virtual scene. When the user starts the game, the virtual person corresponding to the user is firstly set in the virtual area a. When the user walks to the corner of the physical area A [e.g., coordinates (0.2, 0.3)], the target virtual area (e.g. virtual area i) is selected from the plurality of virtual areas. The coordinates (0.2, 0.3) and angle (45°) of the virtual person corresponding to the user in the current virtual area may be acquired. The virtual person may be transferred from the current virtual area (e.g., virtual area a) to the position of the virtual area i having the coordinates (0.2, 0.3) and angle (45°). The scene image of the virtual game may be obtained according to the coordinates (0.2, 0.3) and angle (45°), and the scene image of the virtual game may be displayed.

In the disclosed embodiments, the geometric-shape attribute parameters of the physical area in which the user walks may be acquired. Then, the plurality of virtual areas each matching the geometric-shape attribute parameters may be obtained in the virtual scene. Further, when the user walks to the corner of the physical area, the target virtual area is selected from the plurality of virtual areas and the virtual person corresponding to the user may be transferred from the current virtual area to the target virtual area. The current virtual area may be a virtual area among the plurality of virtual areas corresponding to the user's current walking status. Because the virtual person corresponding to the user is transmitted between the plurality of virtual areas, the disclosed embodiments enable infinite virtual spaces within the confines of limited physical spaces without visual deviation.

Figure 5:
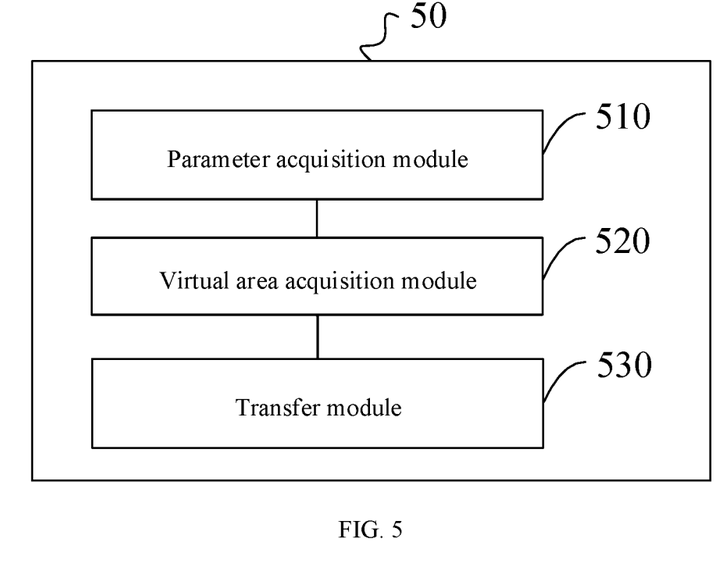
FIG. 5 is a structure diagram of a virtual walking apparatus according to embodiments of the present invention.

In order to achieve the above-mentioned method for virtual walking, the present disclosure also provides a virtual walking apparatus. As shown in FIG. 5, the virtual walking apparatus 50 includes a parameter acquisition module 510, a virtual area acquisition module 520, and a transfer module 530.

The parameter acquisition module 510 is configured to acquire geometric-shape attribute parameters of a physical area in which a user walks.

The virtual area acquisition module 520 is configured, in a virtual scene, to obtain a plurality of virtual areas each matching the geometric-shape attribute parameters.

The plurality of virtual areas may be a plurality of consecutive virtual areas or a plurality of separated virtual areas.

The transfer module 530 is configured, after the user walking to a corner of a physical area, to select a target virtual area from the plurality of virtual areas and transfer a virtual person corresponding to the user from a current virtual area to the target virtual area.

Figure 6:
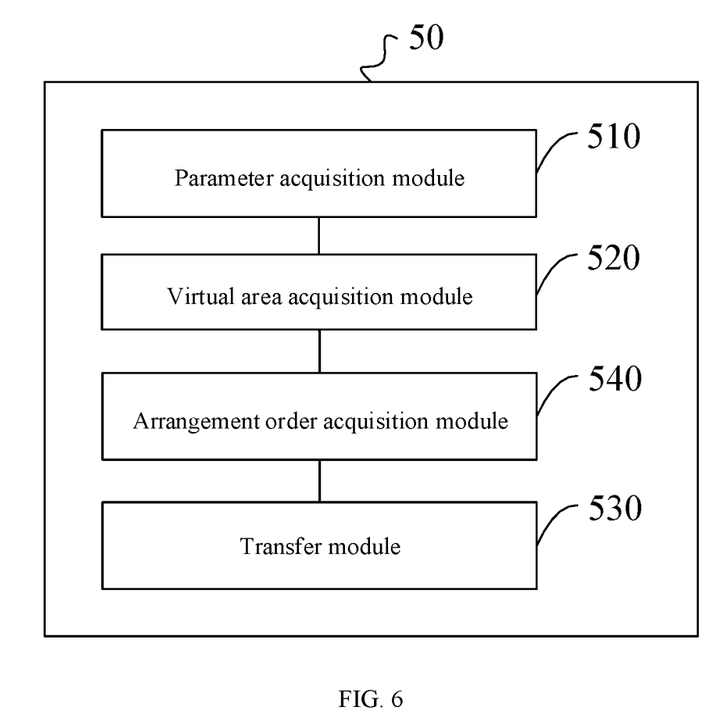
FIG. 6 is a structure diagram of another virtual walking apparatus according to embodiments of the present invention.

In an embodiment, as shown in FIG. 6, the virtual walking apparatus 50 also includes an arrangement order acquisition module 540.

The arrangement order acquisition module 540 is configured to obtain an order of arrangement of the plurality of virtual areas according to a preset path.

Specifically, the transfer module 530 is configured to select the target virtual area according to the current virtual area of the virtual person corresponding to the user and the order of arrangement, and transfer the virtual person corresponding to the user from the current virtual area to the target virtual area.

Figure 7:
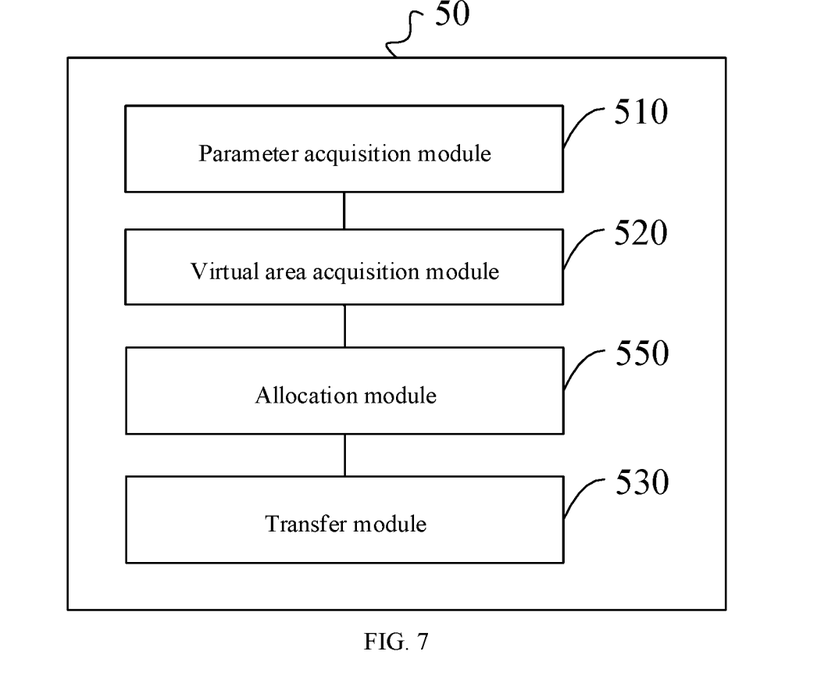
FIG. 7 is a structure diagram of another virtual walking apparatus according to embodiments of the present invention.

In an embodiment, as shown in FIG. 7, the virtual walking apparatus 50 also includes an allocation module 550.

The allocation module 550 is configured to allocate the plurality of virtual areas according to a number of users, where virtual areas corresponding to each user after allocation may be different and not related.

Specifically, the transfer module 530 is configured to select the target virtual area from the virtual areas allocated to the user and transfer the virtual person corresponding to the user from the current virtual area to the target virtual area.

Figure 8:
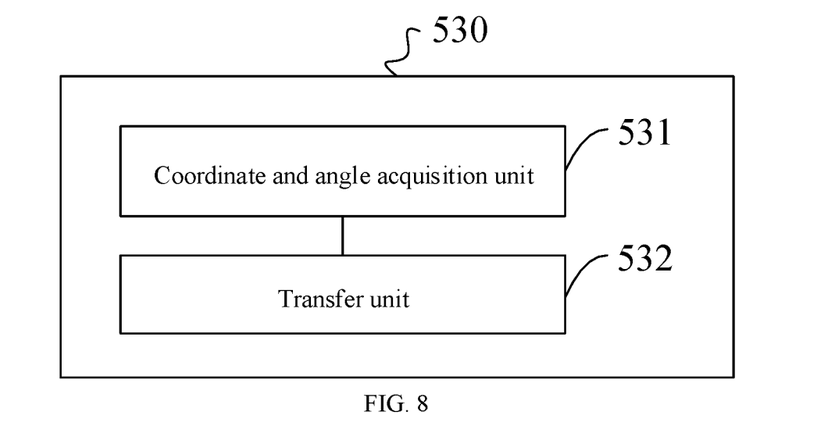
FIG. 8 is a structure diagram of a transfer module in a virtual walking apparatus according to embodiments of the present invention.

As shown in FIG. 8, the transfer module 530 includes a coordinate and angle acquisition unit 531 and a transfer unit 532.

The coordinate and angle acquisition unit 531 is configured to acquire coordinates and angle of the virtual person corresponding to the user in the current virtual area.

The transfer unit 532 is configured to transfer the virtual person corresponding to the user from the current virtual area to a position of the target virtual area having the same coordinates and angle.

Figure 9:
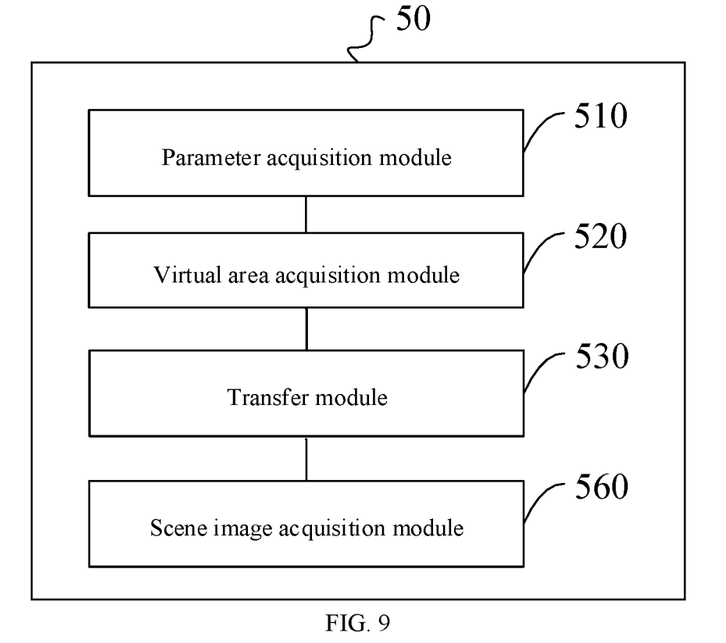
FIG. 9 is a structure diagram of another virtual walking apparatus according to embodiments of the present invention.

In an embodiment, as shown in FIG. 0.9, the virtual walking apparatus 50 also includes a scene image acquisition module 560.

The scene image acquisition module 560 is configured to obtain the scene image of the virtual game according to the coordinates and angle, and to display the scene image of the virtual game.

Therefore, in the disclosed embodiments, the geometric-shape attribute parameters of the physical area in which the user walks may be acquired. Then, the plurality of virtual areas each matching the geometric-shape attribute parameters may be obtained in the virtual scene. Further, when the user walks to the corner of the physical area, the target virtual area is selected from the plurality of virtual areas and the virtual person corresponding to the user may be transferred from the current virtual area to the target virtual area. The current virtual area may be a virtual area among the plurality of virtual areas corresponding to the user's current walking status. Because the virtual person corresponding to the user is transmitted between the plurality of virtual areas, the disclosed embodiments enable infinite virtual spaces within the confines of limited physical spaces without visual deviation.

Figure 11:
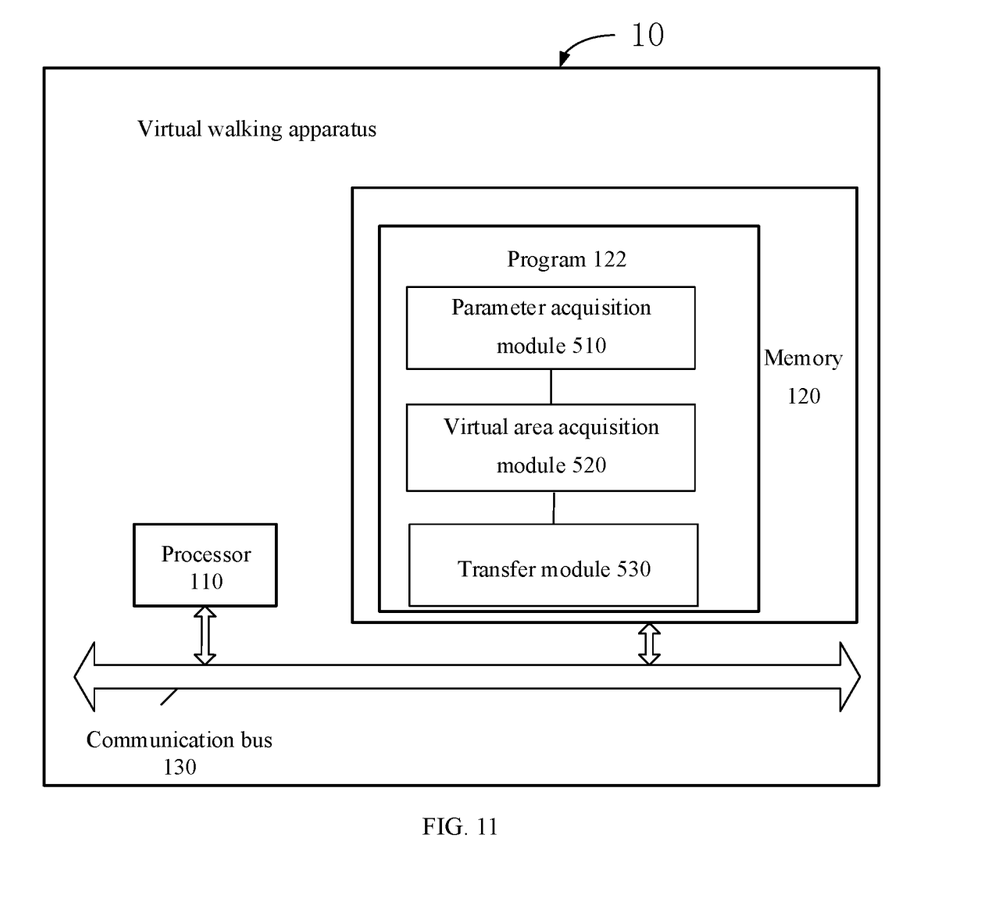
FIG. 11 is a structure diagram of another virtual walking apparatus according to embodiments of the present invention.

Referring to FIG. 11, it is a schematic diagram of a virtual walking apparatus 10 according to embodiments of the present disclosure. The virtual walking apparatus 10 according to the embodiment includes: a processor 110, a memory 120, and a communication bus 130.

The processor 110 and the memory 120 communicate with each other through the communication bus 130.

The processor 110 is configured to execute a program 122.

Specifically, the program 122 may include program codes. The program codes include computer operating instructions.

The processor 110 may be a Central Processing Unit (CPU), or an Application Specific Integrated Circuit (ASIC), or one or more integrated circuits configured to implement embodiments of the present disclosure.

The memory 120 is configured to store the program 122. The memory 120 may contain high-speed RAM memory, and may also include non-volatile memory, such as at least one disk memory. The program 122 may include: a parameter acquisition module 510 configured to acquire geometric-shape attribute parameters of a physical area in which a user walks; a virtual area acquisition module 520 configured to, in a virtual scene, obtain a plurality of virtual areas each matching the geometric-shape attribute parameters; a transfer module 530 configured to, after the user walking to a corner of the physical area, select a target virtual area from the plurality of virtual areas, and transfer a virtual person corresponding to the user from a current virtual area to the target virtual area.

The current virtual area may be a virtual area among the plurality of virtual areas corresponding to the user's current walking status.

The specific implementation of each module in the program 122 can be referred to the corresponding unit in the embodiment shown in FIG. 5 and will not be described herein.

It will be apparent to a person skilled in the art that the specific working processes of the system, apparatus, and units described-above may be referred to the corresponding processes in the foregoing embodiments of the method and will not be described further herein for the convenience and simplicity of the description.

In several disclosed embodiments, it should be understood that the disclosed system, apparatus, and method may be implemented in other ways. For example, the embodiments of the apparatus described-above are merely for illustration. For example, the division of the units is merely a logical function division, and there may be other ways for implementing. For example, multiple units or components may be combined or may be integrated into another system, or some feature may be ignored, or not executed.

In addition, in various disclosed embodiments, the functional units may be integrated into one processing unit, or may physically exist separately, or two or more function units may be integrated into one processing unit.

If functions are implemented in the form of software functional units, and sold or used as a separate product, the functions may be stored in a computer-readable storage medium. Based on this understanding, the technical solution of the present disclosure, in essence, or in the form of a contribution to the prior art, or part of thereof, can be embodied in the form of a software product. The software product stored in a storage medium, includes a number of instructions for enabling a computer device (which may be a mobile phone, a computer, a server, or a network device, etc.) to perform a whole of the method or a part of thereof described in the various disclosed embodiments. The aforementioned storage medium includes various mediums that can store instructions, such as a USB disk, a mobile hard disk, a Read-Only Memory (ROM), a Random Access Memory (RAM), a magnetic disk, or an optical disk, and the like.

The numbers of the disclosed embodiments are merely for the sake of description, and do not represent the advantages and disadvantaged of the embodiments.

It will be apparent to the person in the art that the whole of the steps or the part of thereof according to the above embodiments can be realized by the hardware, and can also be realized by using the program to instruct the implementation of the relevant hardware. The program may be stored in a computer-readable storage medium. The storage medium may be a readable and writable non-volatile memory, a disk, and the like.

The embodiments disclosed herein are preferred embodiments and are not intended to limit the present invention. Any alternations, equivalents, modifications, or advantages to the disclosed embodiments within the spirit and principles of the present disclosure are intended to be encompassed within the scope of the present invention.

What is claimed is:

1. A method for virtual walking performed by a processor of a virtual walking apparatus, the method comprising:
    acquiring, by the processor, geometric-shape attribute parameters of a physical area in which a user walks;
    in a virtual scene, obtaining, by the processor, a plurality of virtual areas each matching the geometric-shape attribute parameters of the physical area;
    after the user walks to a corner of the physical area, selecting, by the processor, a target virtual area from the plurality of virtual areas and transferring a virtual person corresponding to the user from a current virtual area to the target virtual area, wherein the current virtual area is a virtual area among the plurality of virtual areas corresponding to the user's current walking status; and
    displaying a scene image of the virtual scene on a physical display device.

2. The method for virtual walking according to claim 1, after obtaining the plurality of virtual areas, and before selecting the target virtual area from the plurality of virtual areas, further comprising:
    obtaining, by the processor, an order of arrangement of the plurality of virtual areas according to a preset path,
    wherein selecting the target virtual area from the plurality of virtual areas and transferring the virtual person corresponding to the user from the current virtual area to the target virtual area includes:
    selecting, by the processor, the target virtual area according to the current virtual area of the virtual person corresponding to the user and the order of arrangement, and transferring, by the processor, the virtual person corresponding to the user from the current virtual area to the target virtual area.

3. The method for virtual walking according to claim 1, after obtaining the plurality of virtual areas, and before selecting the target virtual area from the plurality of virtual areas, further comprising:
    allocating, by the processor, the plurality of virtual areas according to a number of users, wherein virtual areas corresponding to each user after allocation are different and not related,
    wherein selecting the target virtual area from the plurality of virtual areas and transferring the virtual person corresponding to the user from the current virtual area to the target virtual area includes:
    selecting, by the processor, the target virtual area from the virtual areas allocated to the user and transferring, by the processor, the virtual person corresponding to the user from the current virtual area to the target virtual area.

4. The method for virtual walking according to claim 1, wherein transferring the virtual person corresponding to the user from the current virtual area to the target virtual area includes:
    acquiring, by the processor, coordinates and angle of the virtual person corresponding to the user in the current virtual area; and
    transferring, by the processor, the virtual person corresponding to the user from the current virtual area to a position of the target virtual area having the same coordinates and angle.

5. The method for virtual walking according to claim 4, displaying the scene image of the virtual scene includes:
    obtaining, by the processor, the scene image of a virtual game according to the coordinates and angle, and displaying the scene image of the virtual game.

6. A virtual walking apparatus comprising:
    a memory, storing program codes, and a processor, coupled with the memory and, when the program codes being executed, configured to:
  acquire geometric-shape attribute parameters of a physical area in which a user walks;
  in a virtual scene, obtain a plurality of virtual areas each matching the geometric-shape attribute parameters of the physical area;
  after the user walking to a corner of the physical area, select a target virtual area from the plurality of virtual areas and transfer a virtual person corresponding to the user from a current virtual area to the target virtual area, wherein, the current virtual area is a virtual area among the plurality of virtual areas corresponding to the user's current walking status; and
  display a scene image of the virtual scene on a physical display device.

7. The virtual walking apparatus according to claim 6, wherein the processor is further configured to:
  obtain an order of arrangement of the plurality of virtual areas according to a preset path, and
  select the target virtual area according to the current virtual area of the virtual person corresponding to the user and the order of arrangement, and transfer the virtual person corresponding to the user from the current virtual area to the target virtual area.

8. The virtual walking apparatus according to claim 6, wherein the processor is further configured to:
  allocate the plurality of virtual areas according to a number of users, wherein virtual areas corresponding to each user after allocation is different and not related; and
  select the target virtual area from the virtual areas allocated to the user and transfer the virtual person corresponding to the user from the current virtual area to the target virtual area.

9. The virtual walking apparatus according to claim 6, wherein the processor is further configured to:
  acquire coordinates and angle of the virtual person corresponding to the user in the current virtual area; and
  transfer the virtual person corresponding to the user from the current virtual area to a position of the target virtual area having the same coordinates and angle.

10. The virtual walking apparatus according to claim 9, wherein the processor is further configured to:
  obtain the scene image of a virtual game according to the coordinates and angle, and to display the scene image of the virtual game.

* * * * *